United States Patent [19]
Kimball et al.

[11] Patent Number: 5,532,335
[45] Date of Patent: Jul. 2, 1996

[54] METHOD FOR THERMALLY PROCESSING POLYESTER PELLETS

[75] Inventors: Gregory J. Kimball, Blaine; Ilya Pikus, Plymouth, both of Minn.

[73] Assignee: Hosokawa Bepex Corporation, Minneapolis, Minn.

[21] Appl. No.: 427,801

[22] Filed: Apr. 26, 1995

[51] Int. Cl.$^6$ .................................................... C08F 6/00
[52] U.S. Cl. .................... 528/495; 528/481; 528/491; 528/499; 528/501; 528/502 C; 528/503
[58] Field of Search .................... 528/481, 491, 528/495, 499, 501, 502, 503

[56] References Cited

U.S. PATENT DOCUMENTS

| | | | |
|---|---|---|---|
| 3,014,011 | 12/1961 | Zoetbrood et al. | 528/498 |
| 4,161,578 | 7/1979 | Herron | 528/272 |
| 4,223,128 | 9/1980 | Halek et al. | 528/481 |
| 5,090,134 | 2/1992 | Russemeyer et al. | 34/57 R |

OTHER PUBLICATIONS

CONTINUATOR Brochure, Strong Scott Divison of Berwind Process Equipment Company, Predecessor of Hosokawa Bepex Corporation.
SOLIDAIRE Brochure, Bepex Divison of Berwind Corporation, Predecessor of Hosokawa Bepex Corporation.

*Primary Examiner*—Samuel A. Acquah
*Attorney, Agent, or Firm*—Rockey, Rifkin & Ryther

[57] ABSTRACT

A method for thermally processing polyester pellets by crystallization and polymerization in the solid state which comprises providing a confined processing unit. The pellets are introduced to said unit along with a liquid medium. The combination of pellets and liquid medium is agitated to achieve mixing and the temperature of the agitated mixture is controlled to achieve treating of the polyester pellets in the agitated heating liquid medium at a temperature slightly below the sticking temperature of the polyester. The treatment is continued for a period sufficient to substantially increase the crystallinity and molecular weight of the polyester.

12 Claims, 1 Drawing Sheet

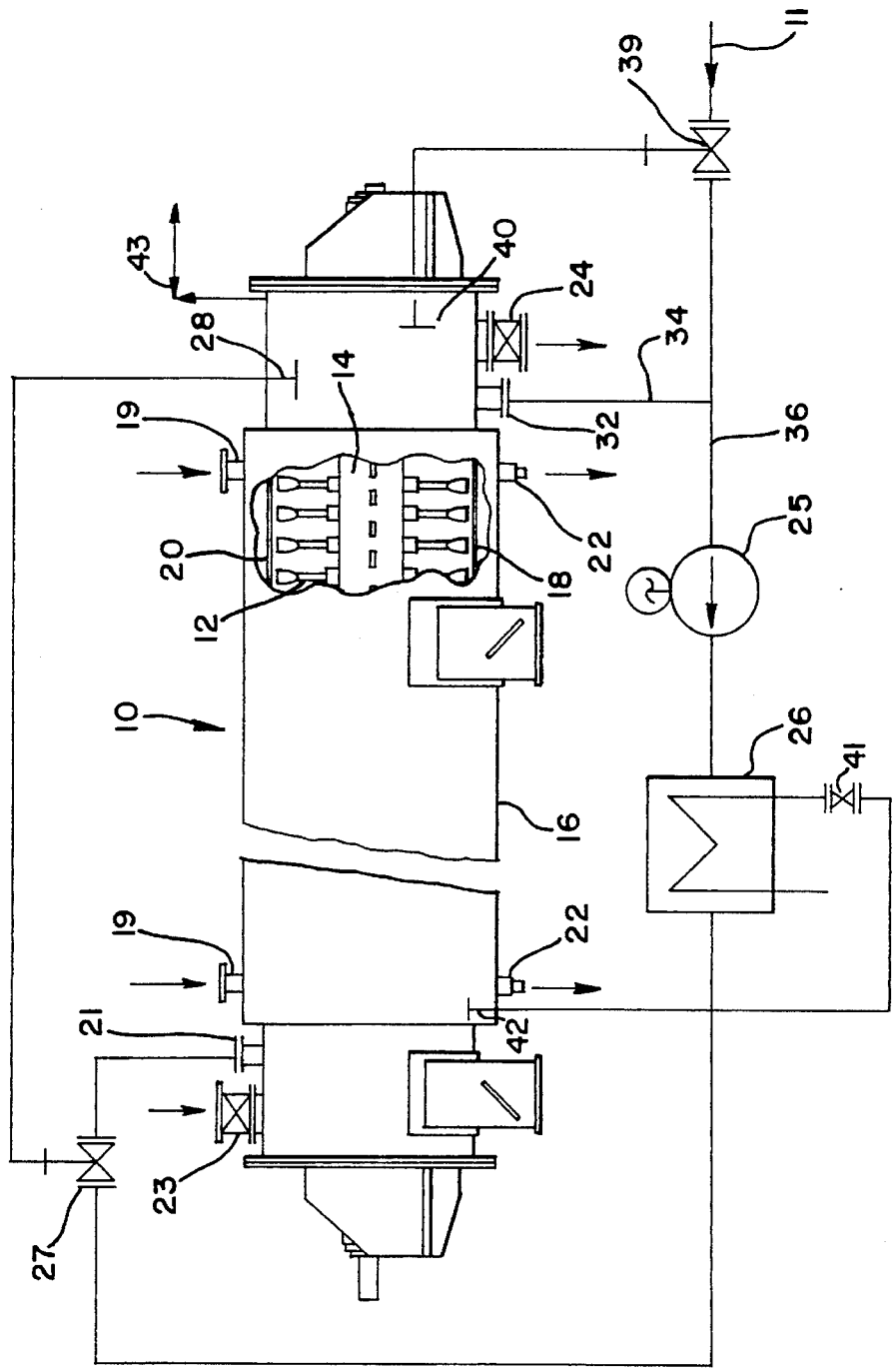

METHOD FOR THERMALLY PROCESSING POLYESTER PELLETS

BACKGROUND OF THE INVENTION

This invention relates to a method for preparation of high molecular weight polyester material, such as pellets or coarse powder, by the solid state crystallization and polymerization or polycondensation of polyesters of lower molecular weight.

The common commercial practice for producing high molecular weight polyester in the solid state involves thermal processing in an inert gas atmosphere or under vacuum at temperatures below the material melting point. High crystallization and/or polymerization rates can be achieved at substantially elevated temperature, but in commercial practice, the reaction temperature is usually restricted by the relatively low sticking temperature of polyester particles. The tendency of the polyester particles to agglomerate when the sticking temperature is reached requires special efforts and technical means to prevent the undesirable effects of such agglomeration and caking in the crystallization/polymerization apparatus during the critical sticky phase.

In order to avoid agglomeration due to stickiness, the prior art has subjected the granulate to continuous vigorous mechanical or aerodynamical agitation. Methods based on mechanical agitation are disclosed, for example, in U.S. Pat. Nos. 4,151,578 and 4,223,128. Methods based on the fluidized bed concept are described in German Patent DE-OS 1,467,213 and in U.S. Pat. No. 5,090,134.

Methods based on mechanical agitation have been utilized in systems incorporating an indirect (conductive) heat supply concept and therefore have limited efficiency in terms of heat transfer and ability to provide an optimal temperature control. These proposals have met with a limited degree of success because it is necessary to employ relatively low processing temperatures thereby restricting the rate of crystallization and/or polymerization. In addition, vigorous agitation of the polyester granules during the thermal processing has a negative effect on the product quality in terms of fines generation and possible deformation of the polyester pellets.

Methods based on aerodynamical agitation (or the fluidized bed concept) have the essential disadvantage of requiring very large quantities of inert gas and in many cases cannot be economically justified due to very high energy consumption and operating cost.

In one attempted solution to solve the sticking problem as described in U.S. Pat. No. 3,014,011, the amorphous polyester pellets are treated with water, saturated steam or organic solvents at temperatures up to 110° C. to effect at least partial crystallization of the granules. The granules are dried at a temperature of about 160° C. to 170° C. while holding movement of the granules to a minimum.

The process according to U.S. Pat. No. 3,014,011 is limited considerably by the boiling temperature of the liquid medium under atmospheric pressure conditions. For example, water boils at 100° C. and for the organic solvent claimed in this proposal (toluene, benzene, nitromethane and acetone) the toluene has the highest boiling point (110.6° C.) under atmospheric pressure. The process temperature is also quite restricted by the fact that crystallization of the polyester is carried out without forced agitation, i.e., holding movement of the granules to a minimum. Accordingly, this method is not subject to being commercialized at such low operating temperatures in the course of solid state crystallization and/or polymerization of polyester material.

SUMMARY OF THE INVENTION

This invention provides an improved process for solid state crystallization and/or polymerization of polyester pellets by thermally processing polymeric materials in an agitated heating liquid medium at optimal temperatures slightly below the sticking temperature of the polyester. The process conditions are maintained by controlling the boiling liquid temperature either by the pressure in the crystallizer/reactor and/or by the chemical composition of the liquid medium.

Pressurized or so-called "superheated" water can be used as a liquid medium in the process proposed. The boiling water temperature can easily be controlled by changing the static pressure in the crystallizer/reactor. For example, under an atmospheric pressure of 14.7 psi absolute, water boils at 212° F. At 50 psi absolute, the boiling temperature is 281° F., and at 100 psi absolute, the boiling temperature is 328° F.

It has been found that when using agitated pressurized water as a heating liquid medium, the crystallization and polymerization of the polyester pellets can be carried out at temperatures higher than their usual sticking temperatures and often extending up to within 10° F. or less of their sticking temperature. Since in the course of the thermal processing the optimal crystallization/polymerization temperature will vary usually over a wide range, the ability to control the process temperature by means of such a simple operation as the static pressure control in the crystallizer/reactor makes the method proposed very efficient in comparison with previous commercial operations.

When using organic liquids or their aqueous mixture as a liquid medium, including various glycols and alcohols, the process temperature can be controlled either by changing the static pressure in the crystallizer/reactor or by means of maintaining the proper water content in the aqueous heating liquid medium. For example, pure 100% ethylene glycol boils at 388° F. at atmospheric pressure. Aqueous ethylene glycol solutions with water content of 10%, 20% and 30% boils at 279° F., 252° F. and 238° F., respectively.

BRIEF DESCRIPTION OF THE DRAWINGS

FIG. 1 is a side elevational view, partly cut away, of a material handling unit of a type suitable for use in the practice of the invention; and, FIG. 2 is an end elevational view of the unit of FIG. 1.

DESCRIPTION OF SPECIFIC EMBODIMENTS

The drawings illustrate a material handling unit 10 of the type manufactured by Hosokawa Bepex Corporation under the trademark SOLIDAIRE®. This unit includes an agitator having paddles 12 mounted on rotor 14 supported within cylindrical housing 16.

The housing includes inner wall 18 whereby steam or hot oil can be introduced at inlets 19 for circulation in the space 20 defined between the inner and outer walls. Condensation or oil may be removed through outlets 22.

Polymer pellets are introduced through inlet 23 and the processed material exits through outlet 24. An additional inlet 21 is provided for water or other liquid medium. This liquid medium is mixed with the polymer pellets for controlling reactions within the unit 10 as will be discussed in greater detail.

The liquid entering the unit through inlet 21 is first moved by means of pump 25 through heater 26 and pressure regulator 27. The heater 26 controls the temperature of the liquid and a pressure sensor 28 is located at a downstream position to control the pressure regulator to ensure maintenance of pressure in the unit 10 at a preselected level.

Outlet 32 of the unit 10 is provided to recirculate water or other liquid through the system. Polymer granules are prevented from passing into the outlet by means of a perforated liquid intake separator. The line 34 from outlet 32 communicates with the feed line 36 which connects to pump 25 whereby the liquid from outlet 32 can be recirculated. Excess liquid drain regulator 43 is used in conjunction with outlet 32.

Make-up liquid can also be added to line 36 for delivery to pump 25 by means of regulator 39. This regulator is controlled by sensor 40 which detects the water (or solvent) content of the liquid medium in the unit 10.

The system described is readily adaptable to the use of water for controlling the processing conditions of polymer pellets introduced to the unit through inlet 23. Thus, the water is heated to a desired temperature by means of heater 26 with the temperature being chosen depending on the ideal processing conditions for the particular polymer being processed. Since this temperature may well exceed the boiling point of water at atmospheric pressure, pressure sensor 28 is employed to ensure that the water is maintained at a pressure adequate to ensure that the water remains in the liquid state. The pressure is maintained since pump 25 will be constantly applying pressure and regulator 27 will be automatically adjusted depending on the output of sensor 28.

In a typical example, polyester pellets are processed at 250° F.–360° F. Water introduced, for instance, at 320° F. will remain in the liquid state for admixture with the pellets as long as the pressure within unit 10 is maintained at 100 psi absolute or higher. Added heat supplied through the jacketed walls of the unit 10 will supplement this heat input to achieve the desired temperature level.

As noted, the heating liquid medium may also comprise a solvent such as an aqueous ethylene glycol solution. In a typical case, polyester pellets are mixed with a 30% water, ethylene glycol solution introduced at 260° F. The unit pressure is maintained at 50 psi absolute to ensure that the solvent remains in the liquid state.

Very heat sensitive polyester pellets containing a relatively high concentration of copolymers have lower sticking temperatures. These materials can be processed effectively in water or in a water miscible organic liquid medium under atmospheric pressure conditions. Where the sticking temperature exceeds 212° F., higher alcohols, for example hexanol with a boiling point of 315° F. at atmospheric pressure can be used as the liquid medium.

Processing with the unit 10 may be conducted in a batch mode wherein a fixed amount of pellets and liquid are introduced, and the unit entry and egress locations sealed during agitation. This form of operation is particularly suited to processing which is conducted over several hours to completion. Where the processing can be conducted during a reasonably short time period as the pellets are transported from one end of the unit 10 to the other, a continuous operation is contemplated.

The speed of the rotor 14 should be maintained high enough to prevent agglomeration of sticky polymer granules and to provide a reasonable rate of heat transfer in the system. However, the top speed of the rotor can be much lower than used in processing wherein the crystallizer is "air-filled". By employing lower speed to avoid sticking, an undesirable generation of fines and/or deformation of polymer pellets is also avoided.

The method of this invention using an agitated heating liquid medium is quite advantageous due to high thermal efficiency achieved because of the very high heat transfer rates in the liquid-solid system. In addition, the method permits control of the process temperature at the highest optimal level (only slightly below the polyester sticking temperature) thereby providing a most economical process.

In contrast with the limitations and difficulties encountered with prior methods which employ vigorous agitation to avoid sticking, the method of this invention provides continuous movement and steady agitation of the pellets in the liquid medium with a minimum effort. Liquid is an excellent lubricator, and the fines generation during thermal processing in a liquid medium as called for by this invention is therefore negligible.

The method of this invention also provides greater flexibility as to reaction rates by the use of optimal reaction temperature kinetics. Thus, the temperature during processing can be controlled by a simple change of pressure and/or water content of the heating liquid medium by obtaining higher molecular weight products than were possible in the prior art.

The system is especially suited for microprocessor or computer control programmed to achieve maximum efficiency depending on the particular characteristics of the polymer to be treated. The control unit employed may receive input from sensors 28 and 40 previously described. In addition, thermocouple 42 is connected to regulator 41 for heater 26 and this provides further input for a program designed for the system. Specifically, the temperature controller will "react" to temperature changes which occur due to changes provided by the pressure regulator 27 and water/solvent content regulator 39.

The water/solvent content sensor 40 may comprise, for example, the Continuous Moisture Analyzer Model BSP-901 with Radio Frequency Moisture Probe manufactured by Moisture Register Products Co. of LaVerne, Calif. Any one of many available flow rate regulators may be used for regulator 39.

Although the drawings illustrate a particular type of processing unit, other units are capable of operation under the conditions of the invention. Hosokawa Bepex Corporation manufactures a unit sold under the trademark CONTINUATOR® which is also suitable for batch or continuous operations and which can be operated at elevated pressure. Other units which are adapted for agitation of product without generation of fines or other adverse effects could also be employed.

It will be understood that various changes and modifications may be made in the practice of the invention without departing from the spirit thereof particularly as defined in the following claims.

That which is claimed is:

1. A method for thermally processing polyester pellets by crystallization and polymerization in the solid state which comprises providing a confined processing unit, introducing said pellets into said unit, introducing a liquid medium into said unit, agitating said pellets and liquid medium to achieve mixing thereof, controlling the temperature of the agitated mixture to achieve treating of the polyester pellets in agitated heating liquid medium at a temperature slightly below the sticking temperature of said polyester, and continuing such treatment for a period sufficient to substantially increase the crystallinity and molecular weight of said polyester.

2. A method according to claim 1 wherein said liquid medium is water.

3. A method according to claim 1 wherein said liquid medium comprises a high boiling organic liquid miscible with water.

4. A method according to claim 1 wherein said liquid medium is maintained at an elevated pressure sufficient to maintain the boiling point of the liquid medium at least said temperature slightly below the sticking temperature of said polyester pellets.

5. A method according to claim 3 wherein said organic liquid has a boiling point slightly below the sticking temperature of said polyester pellets.

6. A method according to claim 3 wherein the liquid medium comprises an alcohol.

7. A method according to claim 1 including the step of providing a heater, and regulating the temperature of said liquid medium with said heater.

8. A method according to claim 7 including the steps of providing a pump and pumping said liquid medium into said unit at a temperature slightly below the sticking temperature of said pellets.

9. A method according to claim 8 wherein the pressure applied to said liquid medium within said unit is sufficient to maintain the liquid medium in a liquid state.

10. A method according to claim 9 including the steps of locating a pressure sensor within said unit, providing a pressure regulator for said pump, sensing the pressure within said unit and controlling the operation of said pressure regulator to maintain said sufficient pressure in response to the pressure sensed.

11. A method according to claim 1 wherein said liquid medium is at least partly water, and including the steps of locating a water content sensor within said unit, sensing the water content of the liquid medium in said unit and varying said water content to achieve control of the temperature of the liquid medium.

12. A method according to claim 1 wherein said liquid medium is at least in part a solvent comprising an alcohol, and including the steps of locating a solvent content sensor within said unit, sensing the solvent content of the liquid medium in said unit and varying said solvent content to achieve control of the temperature of the liquid medium.

* * * * *